(12) United States Patent
Kyle et al.

(10) Patent No.: US 10,641,082 B2
(45) Date of Patent: May 5, 2020

(54) MEASURING LENGTHS OF RESIZABLE ELEMENTS DOWNHOLE

(71) Applicant: Halliburton Energy Services, Inc., Houston, TX (US)

(72) Inventors: Donald Kyle, Plano, TX (US); Paul David Ringgenberg, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 285 days.

(21) Appl. No.: 15/754,116

(22) PCT Filed: Oct. 16, 2015

(86) PCT No.: PCT/US2015/056010
§ 371 (c)(1),
(2) Date: Feb. 21, 2018

(87) PCT Pub. No.: WO2017/065805
PCT Pub. Date: Apr. 20, 2017

(65) Prior Publication Data
US 2018/0245455 A1    Aug. 30, 2018

(51) Int. Cl.
*E21B 47/09*    (2012.01)
*E21B 47/08*    (2012.01)
(Continued)

(52) U.S. Cl.
CPC .......... *E21B 47/091* (2013.01); *E21B 47/082* (2013.01); *E21B 47/14* (2013.01); *G01B 17/00* (2013.01)

(58) Field of Classification Search
CPC ...... E21B 47/091; E21B 47/082; E21B 47/14; G01B 17/00
See application file for complete search history.

(56) References Cited

U.S. PATENT DOCUMENTS

| 5,148,408 A | 9/1992 | Matthews |
| 5,200,894 A | 4/1993 | McCoy et al. |

(Continued)

OTHER PUBLICATIONS

Kool et al., "Acoustic Wireless Telemetry Reduces Uncertainty in Deepwater Drillstem Tests", Journal of Petroleum Technology, available online at http://web.archive.org/web/20150906023224/http://www.spe.org/jpt/article/9481-technology-update-1-14/, Sep. 1, 2015, 5 pages.

(Continued)

*Primary Examiner* — Michael R Wills, III
(74) *Attorney, Agent, or Firm* — Kilpatrick Townsend & Stockton LLP

(57) ABSTRACT

A well tool can include a resizable element that is longitudinally expandable and contractible. The well tool can include a first acoustic sensor unit positioned at a first longitudinal end of the resizable element for receiving a first wireless acoustic signal, waiting for a predefined period of time, and transmitting a second wireless acoustic signal after the predefined period of time has elapsed. The well tool can include a second acoustic sensor unit positioned at a second longitudinal end of the resizable element for transmitting the first wireless acoustic signal at a first time, and receiving the second wireless acoustic signal at a second time. The second acoustic sensor unit can also be positioned for determining a time delay between the first time and the second time, and determining a distance between the first acoustic sensor unit and the second acoustic sensor unit based on the time delay.

20 Claims, 7 Drawing Sheets

(51) Int. Cl.
*E21B 47/14* (2006.01)
*G01B 17/00* (2006.01)

(56) References Cited

U.S. PATENT DOCUMENTS

| | | | |
|---|---|---|---|
| 5,293,937 A | 3/1994 | Schultz et al. | |
| 5,798,488 A | 8/1998 | Beresford et al. | |
| 5,924,499 A | 7/1999 | Birchak et al. | |
| 6,382,332 B1 | 5/2002 | Eaton | |
| 6,400,645 B1 * | 6/2002 | Travor | G10K 11/006 367/4 |
| 6,634,426 B2 | 10/2003 | McCoy et al. | |
| 6,720,764 B2 | 4/2004 | MacInnis et al. | |
| 7,158,446 B2 | 1/2007 | Gardner et al. | |
| 7,274,989 B2 | 9/2007 | Hopper et al. | |
| 7,508,734 B2 | 3/2009 | Kyle et al. | |
| 7,911,879 B2 | 3/2011 | Jogi et al. | |
| 8,322,433 B2 | 12/2012 | Bedouet et al. | |
| 8,731,837 B2 | 5/2014 | Mehta et al. | |
| 8,789,587 B2 | 7/2014 | Tubel et al. | |
| 2004/0020691 A1 | 2/2004 | Krueger | |
| 2005/0224229 A1 | 10/2005 | Blacklaw | |
| 2008/0053652 A1 | 3/2008 | Corre et al. | |
| 2010/0300698 A1 | 12/2010 | Bedouet et al. | |
| 2011/0102188 A1 | 5/2011 | Mehta et al. | |
| 2011/0164468 A1 | 7/2011 | Robbins et al. | |
| 2015/0003202 A1 | 1/2015 | Palmer et al. | |
| 2015/0015413 A1 | 1/2015 | Gao | |
| 2015/0322760 A1 * | 11/2015 | Badri | E21B 28/00 166/308.1 |
| 2017/0107809 A1 * | 4/2017 | Hill | E21B 47/0005 |

OTHER PUBLICATIONS

International Patent Application No. PCT/US2015/056010, "International Search Report and Written Opinion", dated Jul. 27, 2016, 11 pages.

* cited by examiner

MEASURING LENGTHS OF RESIZABLE ELEMENTS DOWNHOLE

TECHNICAL FIELD

The present disclosure relates generally to devices for use in well systems. More specifically, but not by way of limitation, this disclosure relates to a measuring lengths of resizable elements downhole.

BACKGROUND

A well system (e.g., oil or gas wells for extracting fluids from a subterranean formation) can include a wellbore drilled into a formation. It can be desirable to detect characteristics of the wellbore. Well tools can be positioned in the wellbore to detect various characteristics of the wellbore.

DETAILED DESCRIPTION

Figure 1:
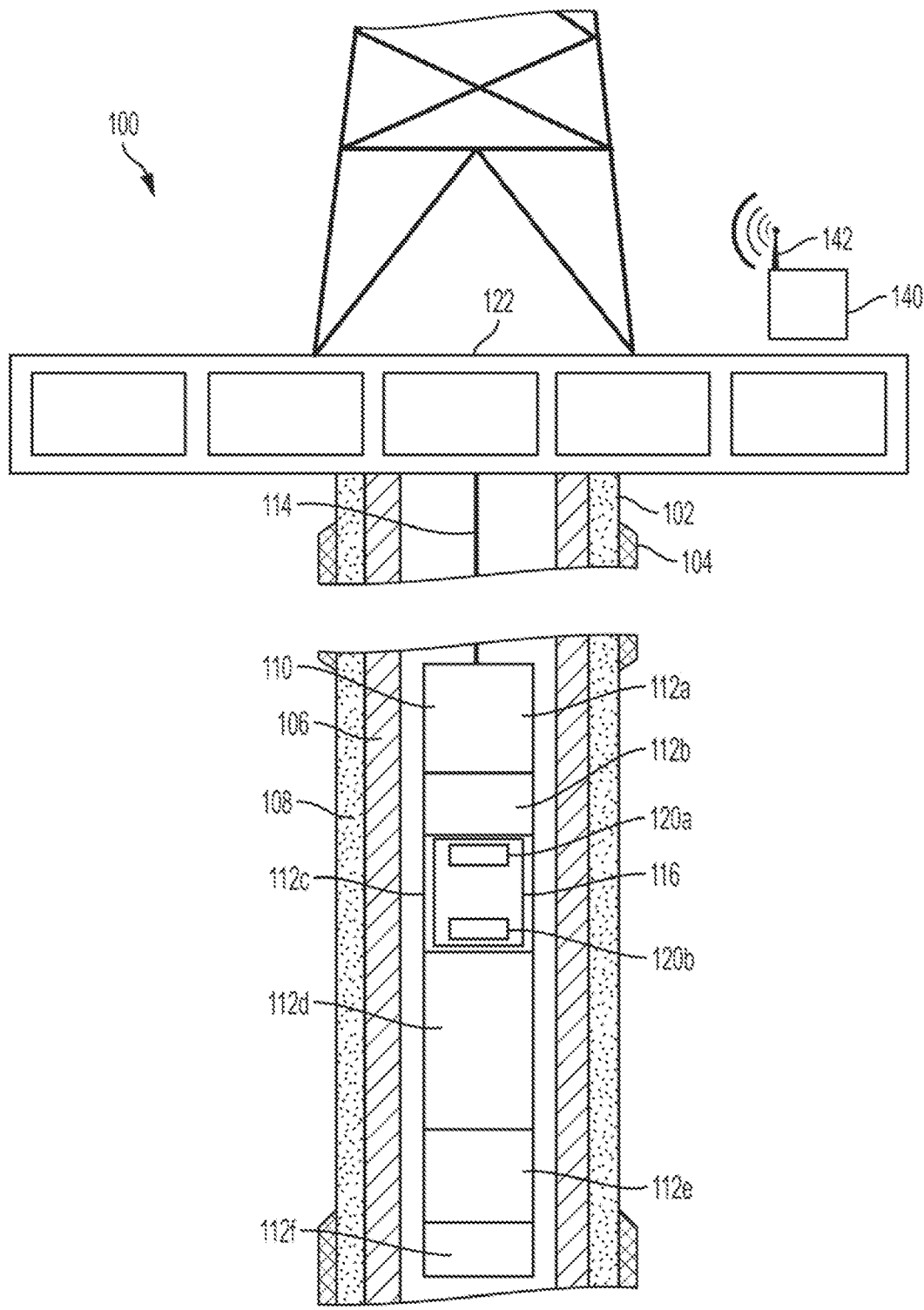
FIG. 1 is a cross-sectional view of an example of a well system that includes a system for measuring lengths of resizable elements downhole according to some aspects.

Certain aspects and features of the present disclosure relate to measuring lengths of resizable elements downhole. A resizable element can include a well tool or a well tool component that can longitudinally, expand, contract, or otherwise change shape. For example, a resizable element can include a telescoping member, such as a slip joint, that can longitudinally expand and contract. In some examples, a total longitudinal length of the resizable element can change due to various downhole forces, such as downhole pressures, temperature fluctuations, or other forces on the resizable element. But a well operator may wish to know the exact longitudinal length of the resizable element for performing a well operation. It can therefore be desirable to determine a total longitudinal length of the resizable element downhole.

In some examples, an acoustic sensor unit can be positioned at one longitudinal end of the resizable element. Another acoustic sensor unit can be positioned at another longitudinal end of the resizable element. The acoustic sensor units can communicate acoustic waves back-and-forth to one another for determining a distance between the acoustic sensor units. The acoustic sensor units can determine the total longitudinal length of the resizable element based on the distance between the acoustic sensor units.

In some examples, the well operator can use a computing device (e.g., positioned at the well surface) to communicate a command (e.g., via a wired or wireless interface) to at least one of the acoustic sensor units. In response to the command, one acoustic sensor unit can transmit an initial acoustic signal (e.g., a pulse) to the other acoustic sensor unit. The other acoustic sensor unit can receive the initial acoustic signal, pause for a predetermined time delay, and transmit a response acoustic signal back to the original acoustic sensor unit. The original acoustic sensor unit can receive the response acoustic signal and determine a time delay between when the initial acoustic signal was sent and when the response acoustic signal was received. The original acoustic sensor unit can also determine a distance between the acoustic sensor units based on the time delay. In some examples, the original acoustic sensor unit can determine the total longitudinal length of the resizable element based on the distance. At least one of the acoustic sensor units can transmit the distance between the acoustic sensor units, the total length of the resizable element, or both to the computing device.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a well system 100 for measuring lengths of resizable elements downhole according to some aspects. The well system 100 includes a wellbore 102 extending through various earth strata. The wellbore 102 extends through a hydrocarbon bearing subterranean formation 104. In some examples, a casing string 106 can extend from the well surface 122 to the subterranean formation 104. The casing string 106 can provide a conduit through which formation fluids, such as production fluids produced from the subterranean formation 104, can travel to the well surface 122. The casing string 106 can be coupled to the walls of the wellbore 102 via cement. For example, a cement sheath 108 can be positioned or formed between the casing string 106 and the walls of the wellbore 102 for coupling the casing string 106 to the wellbore 102.

The well system 100 can include at least one well tool 110 (e.g., drill stem test tool). The well tool 110 can be coupled to a wireline 114, slickline, or coiled tube that can be deployed into the wellbore 102. The wireline 114, slickline, or coiled tube can be guided into the wellbore 102 using, for example, a guide or winch. In some examples, the wireline 114, slickline, or coiled tube can be unwound from around a reel to be deployed into the wellbore 102.

The well tool 110 can include one or more subsystems 112a-f. In some examples, the subsystems 112a-f can include one or more valves, joints, tubulars, hangers, drill collars, packers, absorbers, explosive devices, perforating guns, or any combination of these. For example, subsystem 112a can include a subsea test tree, subsystem 112b can include a fluted hanger, subsystem 112c can include one or more slip joints, subsystem 112d can include a packer, subsystem 112e can include a vertical shock absorber or a radial shock absorber, and/or subsystem 112f can include a perforating gun.

The well tool 110 can include at least one resizable element 116. In some examples, a subsystem 112a-f (e.g., subsystem 112c) of the well tool 110 can be, or can include, the resizable element 116. The resizable element 116 can longitudinally expand, contract, or both. This can cause a total longitudinal length of the resizable element 116 to change.

In some examples, the resizable element 116 can include two or more well tools (or well tool components) that are translatable with respect to one another for longitudinally expanding, contracting, or otherwise changing the total longitudinal length of the resizable element 116. For example, the resizable element 116 can include a well tool with a smaller diameter that is positioned coaxially within another well tool with a larger diameter. The well tools may be able to move (e.g., translate) with respect to one another to change the total longitudinal length of the resizable element 116. An example of a resizable element 116 that includes multiple well tools is described in greater detail with respect to FIG. 5.

Figure 2:
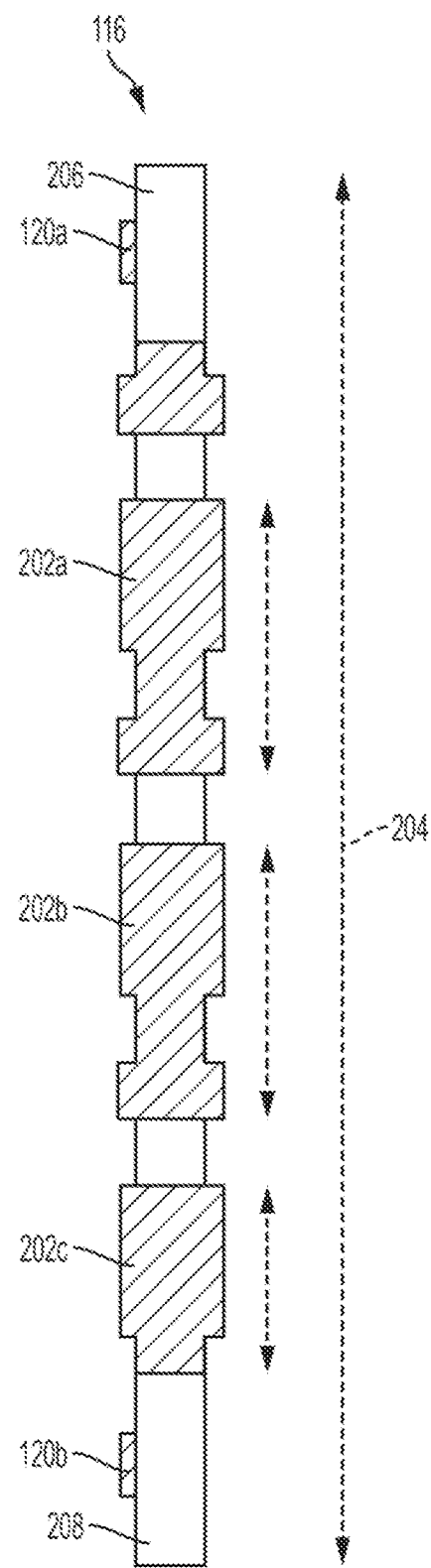
FIG. 2 is a cross-sectional view of an example of a resizable element that includes three telescoping members according to some aspects.

In some examples, the resizable element 116 can include one or more telescoping members (e.g., slip joints) that are longitudinally expandable, retractable, or otherwise resizable. For example, FIG. 2 is a cross-sectional side view of an example of a resizable element 116 that includes three telescoping members 202a-c (e.g., slip joints). As indicated by the dashed arrows, each telescoping member 202a-c can longitudinally expand, contract, or both. Each of the telescoping members 202a-c can longitudinally expand or contract by the same amount or different amounts. For example, each of the three telescoping members 202a-c can longitudinally expand or contact by up to 5 feet (1.2192 meters). In such an example, a total longitudinal length 204 of the resizable element 116 can change by up to 15 feet (4.572 meters).

In some examples, the total longitudinal length 204 of the resizable element 116 can change due to various factors, such as downhole pressures, temperature fluctuations, or other forces on the resizable element 116. These changes can be problematic for a well operator, who may wish to know a depth of a well tool in the wellbore, to verify that one or more well tool subsystems are positioned correctly in the wellbore (e.g., for perforation, well testing, or well production), or both. It can be desirable to determine a total longitudinal length 204 of the resizable element 116.

The resizable element 116 can include at least two acoustic sensor units 120a-b. One acoustic sensor unit 120a can be positioned at one longitudinal end 206 of the resizable element 116. Another acoustic sensor unit 120b can be positioned at another longitudinal end 208 of the resizable element 116. The acoustic sensor units 120a-b can wirelessly communicate acoustic signals between one another. For example, the acoustic sensor unit 120a can transmit a first acoustic signal to acoustic sensor unit 120b. The acoustic sensor unit 120b can receive the first acoustic signal, pause for a predetermined time delay, and transmit a second acoustic signal back to the acoustic sensor unit 120a (e.g., as described in greater detail with respect to FIG. 3). The acoustic sensor unit 120a can receive the second acoustic signal. The acoustic sensor unit 120a can determine a time delay between when the first acoustic signal was sent and when the second acoustic signal was received. In some examples, the acoustic sensor unit 120a can determine the time delay by subtracting a first time corresponding to when the first acoustic signal was sent from a second time corresponding to when the second acoustic signal was received. The acoustic sensor unit 120a can determine a distance between the acoustic sensor units 120a-b based on the time delay. In some examples, based on the distance, the acoustic sensor unit 120a can determine the total longitudinal length 204 of the resizable element 116.

In other examples, the acoustic sensor unit 120b can transmit the first acoustic signal to acoustic sensor unit 120a. The acoustic sensor unit 120a can receive the first acoustic signal, pause for a predetermined time delay, and transmit a second acoustic signal back to the acoustic sensor unit 120b. The acoustic sensor unit 120b can receive the second acoustic signal and determine, based on a time delay between when the first acoustic signal was sent and when the second acoustic signal was received, a distance between the acoustic sensor units 120a-b. Based on the distance, the acoustic sensor unit 120b can determine the total longitudinal length 204 of the resizable element 116.

Figure 3:
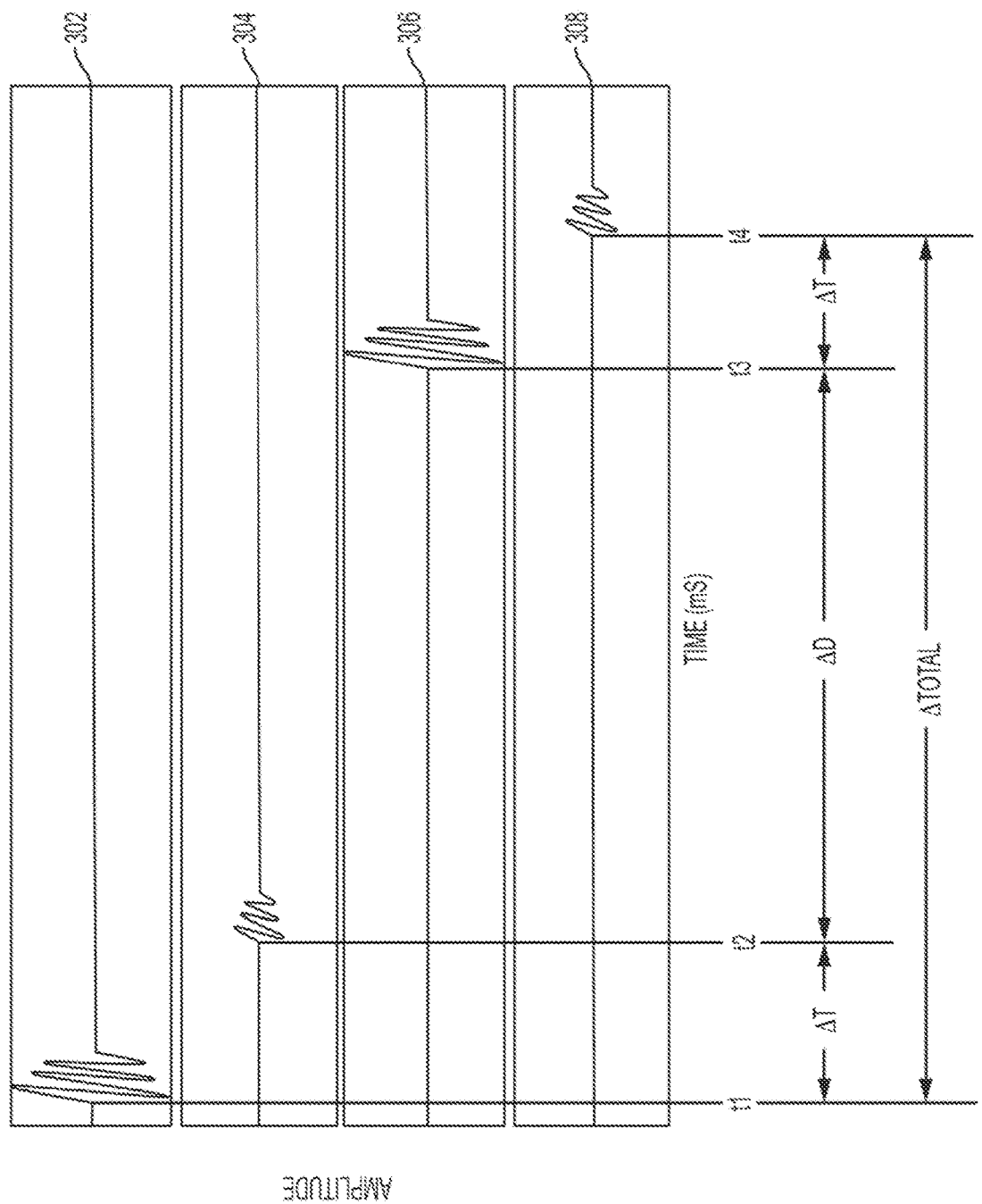
FIG. 3 shows multiple graphs representing an example of acoustic signals transmitted between two acoustic sensors for measuring lengths of resizable elements downhole according to some aspects.

FIG. 3 shows multiple graphs representing an example of acoustic signals transmitted between two acoustic sensors for measuring lengths of resizable elements downhole according to some aspects. Graph 302 shows a first acoustic signal (e.g., an acoustic pulse) being transmitted by a first acoustic sensor unit at time t1. Graph 304 shows the first acoustic signal being received at a second acoustic sensor unit at time t2. The difference between time t1 and time t2 can be time delay $\Delta T$. $\Delta T$ can include an amount of time (e.g., the "flight time") it takes for the first acoustic signal to travel through a medium downhole (e.g., a downhole environment) to the second acoustic sensor. Because loss can occur as the first acoustic signal travels to the second acoustic sensor, the amplitude of the first acoustic signal as received by the second acoustic sensor unit can be smaller than the amplitude of the first acoustic signal as transmitted by the first acoustic sensor. Graph 306 shows the second acoustic sensor unit pausing for a predetermined time delay $\Delta D$ before transmitting a second acoustic signal (e.g., another acoustic pulse) at time t3. Graph 308 shows the second acoustic signal being received at the first acoustic sensor unit at time t4. In some examples, the difference between time t3 and time t4 can be $\Delta T$. Because loss can occur as the second acoustic signal travels to the first acoustic sensor, the amplitude of the second acoustic signal as received by the first acoustic sensor unit can be smaller than the amplitude of the second acoustic signal as transmitted by the second acoustic sensor. The back-and-forth acoustic-signal transmission process shown in FIG. 3 can be referred to as the measurement process.

In some examples, the first acoustic sensor unit can determine a total time delay, $\Delta Total$, between when the first acoustic sensor unit transmitted the first acoustic signal (at time t1) and the first acoustic sensor unit received the second acoustic signal (at time t4). For example, the first acoustic sensor can store time t1 in memory (e.g., memory 408 to FIG. 4). The first acoustic sensor unit can also store time t4 in the memory. The first acoustic sensor unit can subtract time t4 from time t1 to determine $\Delta Total$. In some examples, the first acoustic sensor unit and the second acoustic sensor unit can repeat the measurement process multiple times to determine multiple $\Delta Total$ values. The first acoustic sensor unit can determine an average $\Delta Total$ value from the multiple $\Delta Total$ values. The first acoustic sensor unit can use the average $\Delta Total$ value as the $\Delta Total$ value.

In some examples, the first acoustic sensor unit can determine a distance between the acoustic sensor units. For example, the first acoustic sensor unit can use the following algorithm to determine the distance:

$$Distance = SpeedOfSound * (\Delta Total - \Delta D)/2$$

where Distance is the distance between the acoustic sensor units, SpeedOfSound is a speed of sound in a medium (e.g., steel or air) through which the acoustic signals traveled, $\Delta Total$ is the total time delay between when the first acoustic signal was transmitted and when the second acoustic signal was received, and $\Delta D$ is a predetermined time delay.

In some examples, the SpeedOfSound value can be programmed into the first acoustic sensor unit (e.g., programmed into memory). In other examples, the first acoustic sensor unit can determine the SpeedOfSound value using a calibration process. For example, a well operator can set the total longitudinal length of the resizable element such that a distance between the acoustic sensor units is a known distance. The well operator can set the total longitudinal length of the resizable element prior to positioning the resizable element in the wellbore. In some examples, the well operator can program the known distance between the acoustic sensors into the first acoustic sensor unit. Thereafter, the first acoustic sensor unit and the second acoustic sensor unit can perform the measurement process and determine $\Delta Total$. The first acoustic sensor unit can then use the following algorithm to determine the SpeedOfSound value:

$$SpeedOfSound = (2 * KnownDistance)/(\Delta Total - \Delta D)$$

where SpeedOfSound is the speed of sound in the medium through which the acoustic signals traveled, KnownDistance is the known distance between the acoustic sensor units, $\Delta Total$ is the total time delay between when the first acoustic signal was transmitted and when the second acoustic signal was received, and $\Delta D$ is a predetermined time delay. The first acoustic sensor unit can store the determined SpeedOfSound value for subsequent use (e.g., to determine a distance between the acoustic sensor units after the resizable element changes in total longitudinal length).

In some examples, the first acoustic sensor unit can transmit a time delay (e.g., the total time delay $\Delta Total$), a distance between the acoustic sensor units, a total longitudinal length of the resizable element, or any combination of these to a computing device (e.g., positioned uphole). For example, referring back to FIG. 1, one or both of the acoustic sensor units 120a-b can transmit a determined time delay, distance between the acoustic sensor units 120a-b, total longitudinal length of the resizable element 116, or any combination of these to a computing device 140. In some examples, the well operator can refer to the computing device 140 to determine the total longitudinal length of the resizable element 116.

The computing device 140 can be positioned on aboveground, below ground, or offsite. The computing device 140 can include a processor interfaced with other hardware via a bus. A memory, which can include any suitable tangible (and non-transitory) computer-readable medium, such as RAM, ROM, EEPROM, or the like, can embody program components that configure operation of the computing device 140. In some aspects, the computing device 140 can include input/output interface components (e.g., a display, printer, keyboard, touch-sensitive surface, and mouse) and additional storage.

The computing device 140 can include a communication device 142. The communication device 142 can represent one or more of any components that facilitate a network connection. In the example shown in FIG. 1, the communication device 142 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication device 142 can use acoustic waves, mud pulses, surface waves, vibrations, optical waves, or induction (e.g., magnetic induction) for engaging in wireless communications. In other examples, the communication device 142 can be wired and can include interfaces such as Ethernet, USB, IEEE 1394, or a fiber optic interface.

The computing device 140 can receive wired or wireless communications from an acoustic sensor unit 120a-b via the communication device 142 and perform one or more tasks based on the communications. For example, the computing device 140 can receive data (e.g., a time delay) associated with a distance between the acoustic sensor units 120a-b, a total longitudinal length of the resizable element 116, or both. The computing device 140 can output, via a display, printer, or other device, a representation of the data. In some examples, the computing device 140 can receive a wireless communication from an acoustic sensor unit 120a-b indicating a time delay associated with the distance between the acoustic sensor units 120a-b. The computing device 140 can determine the total longitudinal length of the resizable element 116, the distance between the acoustic sensor units 120a-b, or both based on the time delay (e.g., using any of the algorithms or methods discussed above).

In some examples, the measurement process can be initiated by a well operator. For example, the well operator can use the computing device 140 to transmit a command to an acoustic sensor unit 120a-b. The acoustic sensor unit 120a-b can receive the command and, in response to the command, execute at least a portion of the measurement process. An acoustic sensor unit 120a-b can additionally or alternatively initiate the measurement process in response to other events. For example, an acoustic sensor unit 120a-b can initiate the measurement process at a particular time, at particular time intervals (e.g., every 10 minutes), or both. In some examples, an acoustic sensor unit 120a-b can initiate the measurement process based on sensor signals from a sensor. For example, an acoustic sensor unit 120a-b can be in communication with a sensor, such as a pressure sensor, a temperature sensor, an accelerometer, a gyroscope, etc. The acoustic sensor unit 120a-b can receive sensor signals from the sensor and, based at least in part on the sensor signals, initiate the measurement process. For example, the acoustic sensor unit 120a-b can initiate the measurement process based on a sensor signal indicating that a detected pressure exceeded a threshold, a detected pressure change exceeded a threshold, that the well tool 110 has not moved for a period of time, that the well tool 110 or a well tool subsystem 112a-e is rotating or has rotated, or any combination of these.

Figure 4:
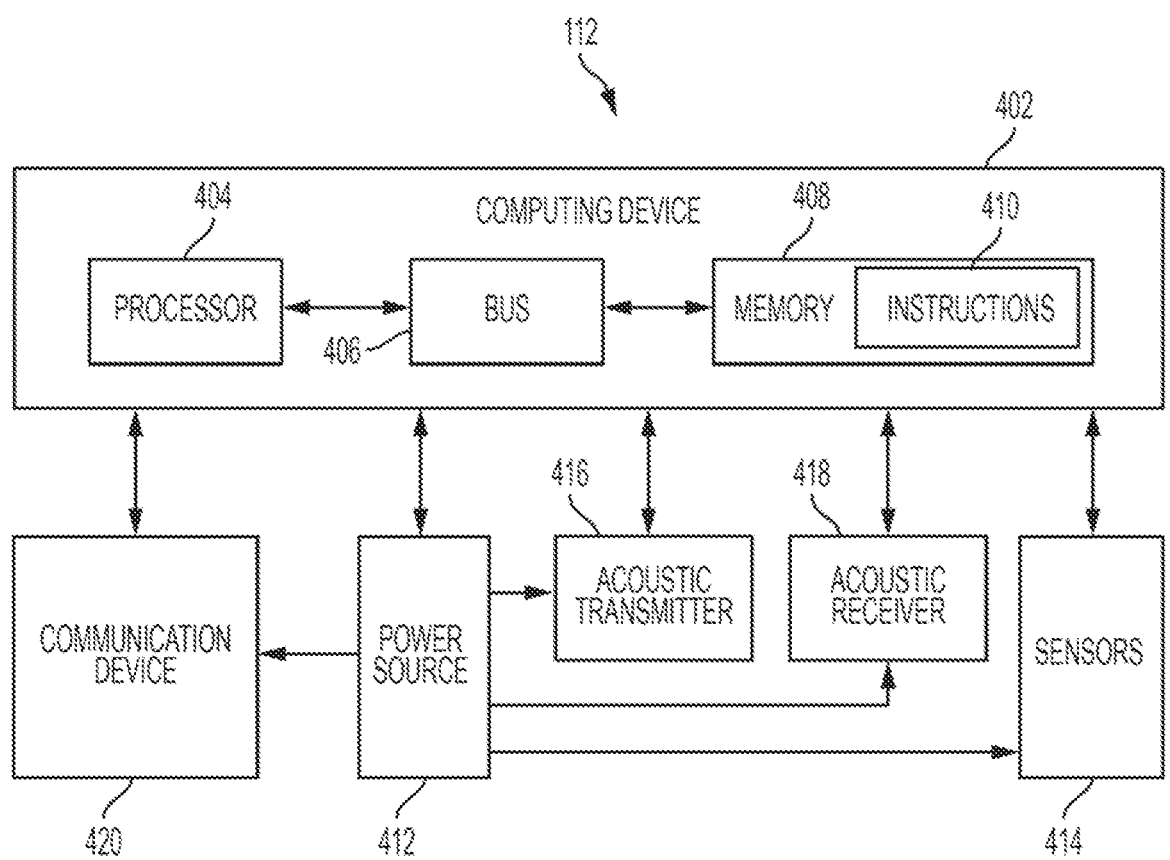
FIG. 4 is a block diagram of an acoustic sensor unit for measuring lengths of resizable elements downhole according to some aspects.

FIG. 4 is a block diagram of an acoustic sensor unit 112 for measuring lengths of resizable elements downhole according to some aspects. In some examples, the components shown in FIG. 4 (e.g., the computing device 402, power source 412, sensors 414, acoustic transmitter 416, acoustic receiver 418, communication device 420) can be integrated into a single structure. For example, the components can be within a single housing. In other examples, the components shown in FIG. 4 can be distributed (e.g., in separate housings) and in electrical communication with each other.

In some examples, the acoustic sensor unit 112 can include a computing device 402. The computing device 402 can include a processor 404, a memory 408, and a bus 406.

The processor 404 can execute one or more operations for measuring lengths of resizable elements downhole. The processor 404 can execute instructions 410 stored in the memory 408 to perform the operations. The processor 404 can include one processing device or multiple processing devices. Non-limiting examples of the processor 404 include a Field-Programmable Gate Array ("FPGA"), an application-specific integrated circuit ("ASIC"), a microprocessor, etc.

The processor 404 can be communicatively coupled to the memory 408 via the bus 406. The non-volatile memory 408 may include any type of memory device that retains stored information when powered off. Non-limiting examples of the memory 408 include electrically erasable and programmable read-only memory ("EEPROM"), flash memory, or any other type of non-volatile memory. In some examples, at least some of the memory 408 can include a medium from which the processor 404 can read the instructions 410. A computer-readable medium can include electronic, optical, magnetic, or other storage devices capable of providing the processor 404 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions 410 may include processor-specific instructions generated by a compiler or an interpreter from code written in any suitable computer-programming language, including, for example, C, C++, C#, etc.

The acoustic sensor unit 112 can include one or more sensors 414. The sensors 414 can detect characteristics associated with a well tool, a downhole environment, and/or the subterranean formation. In some examples, the sensors 414 can include a temperature sensor, a pressure sensor, an accelerometer, a gyroscope, an inclinometer, or any combination of these. The sensors 414 can transmit sensor signals associated with the characteristics to the computing device 402.

The acoustic sensor unit 112 can include a power source 412. The power source 412 can be in electrical communication with the computing device 402, the sensors 414, the communication device 420, the acoustic transmitter 416, the acoustic receiver 418, or any combination of these components. The power source 412 can power any of these components. In some examples, the power source 412 can include a battery. In other examples, the power source 412 can include a power cable (e.g., a wireline).

The acoustic sensor unit 112 can include a communication device 420. In some examples, the communication device can be configured substantially the same as the communication device 142 of FIG. 1. The communication device 420 can include a wired interface or a wireless interface (which can include an antenna). For example, the communication device 420 can include a wireline for transmitting data uphole. The wireline can additionally provide power to the acoustic sensor unit 112. In some examples, part of the communication device 420 can be implemented in software. For example, the communication device 420 can include instructions stored in memory 408.

The acoustic sensor unit 112 can use the communication device 420 to communicate with one or more external devices (e.g., another acoustic sensor unit 112 or the computing device 140 of FIG. 1). In some examples, the communication device 420 can amplify, filter, demodulate, demultiplex, demodulate, frequency shift, and otherwise manipulate a signal received from an external device. The communication device 420 can transmit a signal associated with the received signal to the processor 404. The processor 404 can receive and analyze the signal to determine data associated with the signal. In some examples, the processor 404 can perform one or more functions based on the data. For example, the processor 404 can determine that the data includes a command configured to initiate the measurement process. Based on the data, the processor 404 can initiate the measurement process. In some examples, after the measurement process is complete, the processor 404 can transmit a signal to the communication device 420 configured to cause the communication device 420 to transmit a result of the measurement process to the external device.

In some examples, the acoustic sensor unit 112 can include an acoustic transmitter 416. The acoustic transmitter 416 can receive a signal from the acoustic sensor unit 112 (e.g., the computing device 402) and output one or more acoustic signals. Examples of the acoustic transmitter 416 can include speaker, a piezoelectric device, etc. In some examples, the acoustic sensor unit 112 can include an acoustic receiver 418. The acoustic receiver 418 can detect acoustic signals and transmit associated signals to the acoustic sensor unit 112 (e.g., the computing device 402). Examples of the acoustic receiver 418 can include a microphone, a piezoelectric device, etc. In some examples, the acoustic transmitter 416 and acoustic receiver 418 can be combined into a single acoustic transducer. For example, the acoustic sensor unit 112 can include an acoustic transducer capable of performing the functions of both the acoustic transmitter 416 and the acoustic receiver 418.

In some examples, the acoustic sensor unit 112 can include other hardware or software. For example, the acoustic sensor unit 112 can include a transistor, resistor, capacitor, inductor, integrated circuit component, another memory device, another processor, an operational amplifier, a tube, a comparator, a timing device, or any combination of these.

Figure 5:
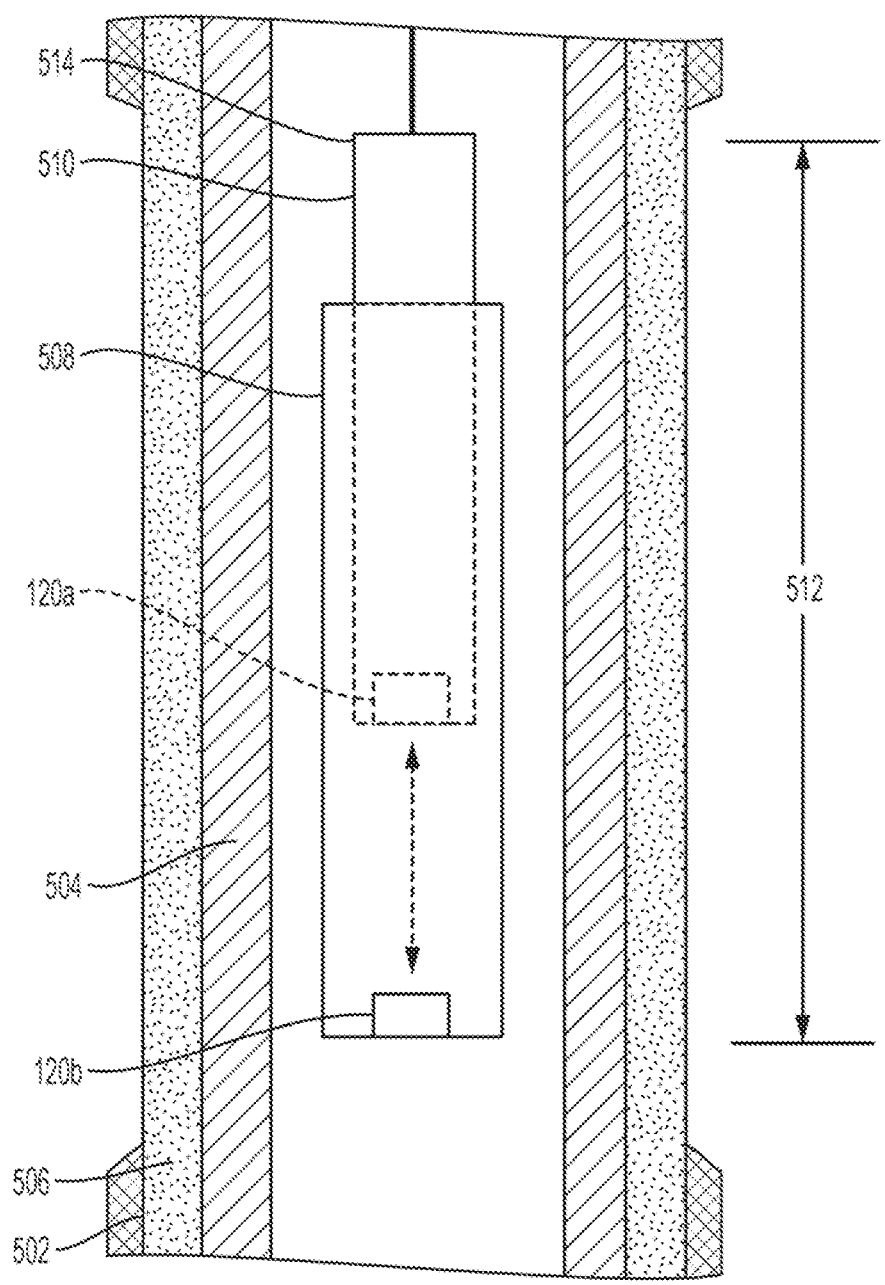
FIG. 5 is a cross-sectional view of an example of a part of a well system that includes a system for measuring lengths of resizable elements downhole according to some aspect.

FIG. 5 is a cross-sectional view of an example of a part of a well system that includes a system for measuring lengths of resizable elements downhole according to some aspect. The well system includes a wellbore 502. The wellbore 502 can include a casing string 504 and a cement sheath 506.

The wellbore 502 can include a well tool 508. An example of the well tool 508 can be a packer. The wellbore 502 can include another well tool 510. An example of the well tool 510 can be a seal assembly. In some examples, a combination of the well tools 508, 510 can make up a resizable element. For example, the resizable element can include the well tool 510 positioned coaxially within an inner diameter of the other well tool 508.

In some examples, the well tools 508, 510 can translate with respect to one another, as shown by the dashed arrow. This can allow the resizable element to longitudinally expand, contract, or both, thereby changing a total longitudinal length 512 of the resizable element. For example, the well tool 508 can include a packer and the other well tool 510 can include a sealing assembly. The seal assembly can be pushed into or otherwise translated through at least a portion of the packer to seal the portion of the packer from an environment in the wellbore 502. Translating the seal assembly through the portion of the packer can change the total longitudinal length 512 of the resizable element.

In some examples, an acoustic sensor unit 120a can be positioned at a longitudinal end of the well tool 510. Another acoustic sensor unit 120b can be positioned at another longitudinal end of the other well tool 508. As the well tools 508, 510 translate with respect to one another, the acoustic sensor units 120a-b can move closer together or farther apart. In some examples, the acoustic sensor units 120a-b can perform the measurement process (e.g., described above with respect to FIGS. 2-3) to determine a distance between the acoustic sensor units 120a-b. One or both of the acoustic sensor units 120a-b can determine the total longitudinal length 512 of the resizable element based on the distance. For example, an acoustic sensor unit 120a-b can determine the total longitudinal length 512 of the resizable element using the following algorithm:

Total Longitudinal Length=ΔDistance+Offset where Total Longitudinal Length is the total longitudinal length 512 of the resizable element, ΔDistance is the distance between the two acoustic sensor units 120a-b, and Offset is a distance between the acoustic sensor unit 120a and an opposite longitudinal end 514 of the well tool 510.

In some examples, a well operator can program the Offset value into the acoustic sensor unit 120a-b. For example, a well operator can program into the acoustic sensor unit 120a that the Offset value is 9 feet (2.7432 meters). In one such example, the acoustic sensor units 120a-b can perform the measuring process, and the acoustic sensor unit 120a can determine a distance between the acoustic sensor units 120a-b is 3 feet (0.9144 meters). The acoustic sensor unit 120a can add the 9 feet to the 3 feet and determine that the total longitudinal length 512 of the resizable element is 12 feet (3.6576).

The resizable element can include any number of acoustic sensor units 120a-b and well tools 508, 510 in any suitable configuration. For example, in an alternative configuration, the resizable element can include the acoustic sensor unit 120a positioned at the longitudinal end 514 of the well tool 510. The acoustic sensor units 120a-b can perform the measuring process and determine that the total longitudinal length 512 of the resizable element is substantially the same as the distance between the acoustic sensor units 120a-b.

Figure 6:
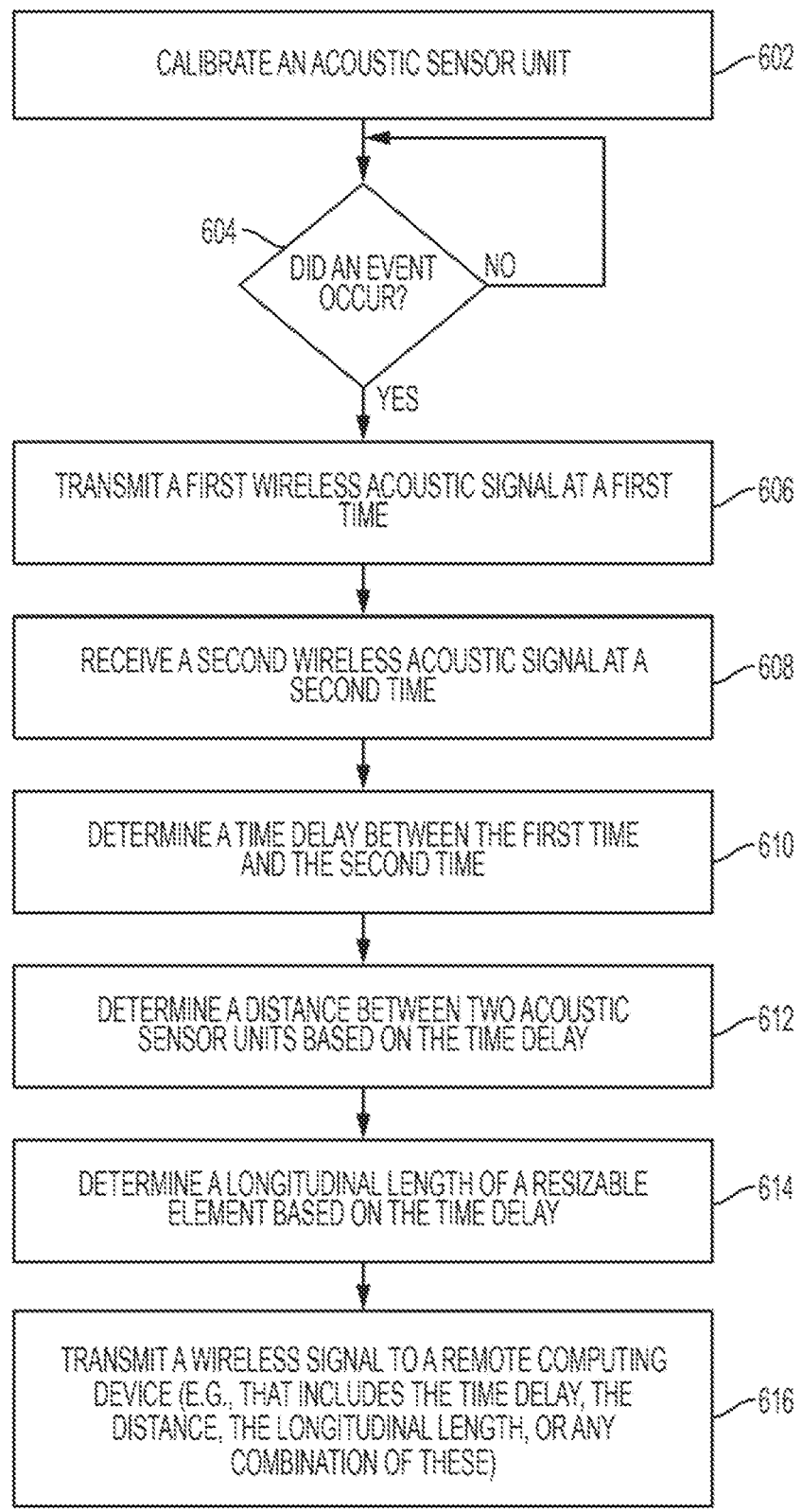
FIG. 6 is a flow chart of an example of a process for measuring lengths of resizable elements downhole according to some aspects.

FIG. 6 is a flow chart of an example of a process for measuring lengths of resizable elements downhole according to some aspects.

In block 602, an acoustic sensor unit is calibrated. The acoustic sensor unit can be coupled to a first longitudinal end of a resizable element. The resizable element can be, or can be positioned in, a well tool.

In some examples, the acoustic sensor unit can be calibrated using any other the methods discussed above (e.g., discussed with respect to FIG. 3). For example, the acoustic sensor unit can calibrate itself by determining a speed of sound associated with a medium (e.g., a material) positioned between the acoustic sensor unit and another acoustic sensor unit. In other examples, the acoustic sensor unit can be calibrated via user input. For example, a well operator can input a speed of sound into the acoustic sensor unit. The acoustic sensor unit can receive the speed of sound and store the speed of sound in memory (e.g., memory 408 of FIG. 4).

In block 604, the acoustic sensor unit determines if an event occurred. In some examples, an event can include a predetermined interval of time elapsing, a predetermined time occurring, the receipt of a command from a remote computing device, or any combination of these. For example, the acoustic sensor unit can determine the event occurred in response to receiving a wireless signal from a remote computing device that includes a particular command.

In some examples, the acoustic sensor unit can determine the event occurred based on a sensor signal from a sensor. For example, the acoustic sensor unit can receive a sensor signal from a pressure sensor, a temperature sensor, an accelerometer, a gyroscope, an inclinometer, or any combination of these. The acoustic sensor unit can determine that the event occurred based on the sensor signal. For example, the acoustic sensor unit can determine the event occurred based on a detected pressure exceeding a threshold, a detected temperature exceeding a threshold, a detected rotation speed of a well tool exceeding a threshold, or any combination of these.

If the acoustic sensor unit determines that the event occurred, the process can proceed to block 606. Otherwise, the process can return to block 604.

In block 606, the acoustic sensor unit transmits a first wireless acoustic signal at a first time. For example, the acoustic sensor unit can transmit a pulse to an acoustic transmitter, such as a speaker or piezoelectric transducer, to generate the first wireless signal at the first time. In some examples, the acoustic sensor unit can store a timestamp associated with the first time in memory.

In block 608, the acoustic sensor unit receives a second wireless acoustic signal at a second time. For example, the acoustic sensor unit can use an acoustic receiver, such as a microphone or piezoelectric transducer, to receive the second wireless signal at the second time. In some examples, the acoustic sensor unit can store a timestamp associated with the second time in memory.

In block 610, the acoustic sensor unit determines a time delay between the first time and the second time. For example, the acoustic sensor unit can retrieve a timestamp associated with the first time and another timestamp associated with the second time from memory. The acoustic sensor unit can subtract one timestamp from another timestamp to determine the time delay between the first time and the second time.

In block 612, the acoustic sensor unit determines a distance between two acoustic sensing units based on the time delay. The acoustic sensor unit can use any of the methods discussed above (e.g., with respect to FIG. 3) to determine the distance. For example, the acoustic sensor unit can use the following algorithm to determine the distance:

Distance=SpeedOfSound*(ΔTotal−ΔD)/2 where Distance is the distance between the acoustic sensor units, SpeedOfSound is a speed of sound in a medium (e.g., steel or air) through which the acoustic signals traveled, ΔTotal is the total time delay between when the first acoustic signal was transmitted and when the second acoustic signal was received, and ΔD is a predetermined time delay.

In block 614, the acoustic sensor unit (or a remote computing device in communication with the acoustic sensor unit) determines a longitudinal length of a resizable element based on the time delay. For example, the acoustic sensor unit (or the remote computing device) can determine the distance between two acoustic sensor units based on the time delay, as described in block 612. The distance between the two acoustic sensing units can correspond to the portion of the longitudinal length of the resizable element that is positioned between the acoustic sensing units. In examples where the acoustic sensor units are positioned exactly at the longitudinal ends of the resizable element, the distance between the acoustic sensing units can be the longitudinal length of the resizable element. In examples where the acoustic sensor units are positioned near, but not exactly at, the longitudinal ends of the resizable element, the distance between the acoustic sensing units can include most of the longitudinal length of the resizable element. The distance between the acoustic sensing units can therefore be used as a reasonable approximation of the longitudinal length of the resizable element. In other examples where the acoustic sensor units are farther from the longitudinal ends of the resizable element, the distance between the acoustic sensing units can be added to a calibration amount to determine the longitudinal length of the resizable element. The calibration amount can represent a distance between a location of an acoustic sensing unit coupled to the resizable element and a proximate longitudinal end of the resizable element. In some examples, the calibration amount can be stored in memory.

In block 616, the acoustic sensor unit transmits a wireless signal to a remote computing device. The wireless signal can include the time delay, the distance between the acoustic sensing units, the longitudinal length of the resizable element, or any combination of these. For example, the acoustic sensor unit can transmit a wireless signal that includes the time delay to the remote computing device. In some examples, the remote computing device can receive the wireless signal and determine, based on the wireless signal, the distance between the acoustic sensing units, the longitudinal length of the resizable element, or both.

Figure 7:
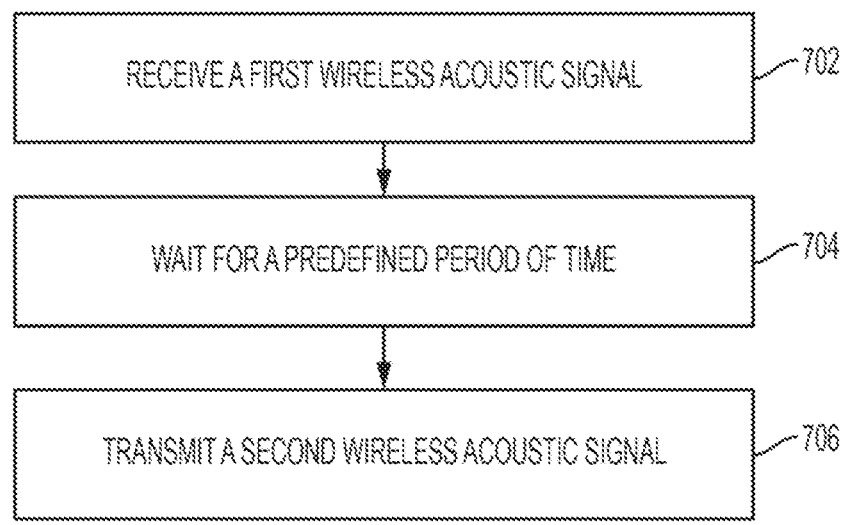
FIG. 7 is a flow chart of an example of another process for measuring lengths of resizable elements downhole according to some aspects.

FIG. 7 is a flow chart of an example of another process for measuring lengths of resizable elements downhole according to some aspects. Any of the steps shown in FIG. 7 can be performed additionally or alternatively to any of the steps shown in FIG. 6.

In block 702, an acoustic sensor unit receives a first wireless acoustic signal (e.g., from another acoustic sensor unit). For example, the acoustic sensor unit can use an acoustic receiver, such as a microphone or piezoelectric transducer, to receive the first wireless signal.

In block 704, the acoustic sensor unit waits (e.g., pauses) for a predefined period of time. In some examples, the predefined period of time can be input by a user and subsequently stored in memory (e.g., memory 410 of FIG. 4). For example, a user can input the predefined period of time via a keyboard, mouse, touch-screen display, or other input device. The acoustic sensor unit can receive the predefined period of time via the input device and store the predefined period of time in memory.

In block 706, an acoustic sensor unit transmits a second wireless acoustic signal (e.g., to another acoustic sensor unit). For example, the acoustic sensor unit can transmit a pulse to an acoustic transmitter, such as a speaker or piezoelectric transducer, to generate the second wireless signal.

In some aspects, systems and methods for measuring lengths of resizable elements downhole are provided according to one or more of the following examples:

Example #1

A well tool for use in a wellbore can include a resizable element that is longitudinally expandable and contractible. The well tool can include a first acoustic sensor unit positioned at a first longitudinal end of the resizable element for receiving a first wireless acoustic signal, waiting for a predefined period of time, and/or transmitting a second wireless acoustic signal after the predefined period of time has elapsed. The well tool can include a second acoustic sensor unit positioned at a second longitudinal end of the resizable element for transmitting the first wireless acoustic signal at a first time, receiving the second wireless acoustic signal at a second time, determining a time delay between the first time and the second time, and/or determining a distance between the first acoustic sensor unit and the second acoustic sensor unit based on the time delay.

Example #2

The well tool of Example #1 may feature the resizable element including a first telescoping member, a second telescoping member positioned adjacent to the first telescoping member, and/or a third telescoping member positioned adjacent to the second telescoping member. The well tool may also feature the first wireless acoustic signal including a pulse. The well tool may also feature the second wireless acoustic signal including another pulse.

Example #3

The well tool of Example #2 may feature the well tool including a drill stem test tool. The well tool may feature the first telescoping member including a first slip joint, the second telescoping member including a second slip joint, and/or the third telescoping member including a third slip joint.

Example #4

The well tool of any of Examples #1-3 may feature the second acoustic sensor unit including a communication device for wirelessly communicating the time delay or the distance between the first acoustic sensor unit and the second acoustic sensor unit to a computing device. The computing device can be positionable external to the wellbore.

Example #5

The well tool of any of Examples #1-4 may feature the second acoustic sensor unit including a processing device and a memory device in which instructions executable by the processing device are stored. The instructions can be for causing the processing device to transmit the first wireless acoustic signal at the first time. The instructions can be for causing the processing device to receive the second wireless acoustic signal at the second time. The instructions can be for causing the processing device to determine the time delay between the first time and the second time by subtracting the first time from the second time. The instructions can be for causing the processing device to determine the distance between the first acoustic sensor unit and the second acoustic sensor unit based on the time delay. The instructions can be for causing the processing device to transmit a wireless signal to a computing device. The wireless signal can include the time delay or the distance between the first acoustic sensor unit and the second acoustic sensor unit.

Example #6

The well tool of any of Examples #1-5 may feature the second acoustic sensor unit being configured to transmit the first wireless acoustic signal at the first time in response to a command from a remote computing device or a predetermined time interval elapsing.

Example #7

The well tool of any of Examples #1-6 may feature the second acoustic sensor unit being configured to transmit the first wireless acoustic signal at the first time in response to a sensor signal from a pressure sensor, a temperature sensor, an accelerometer, a gyroscope, and/or an inclinometer.

Example #8

A system for use in a wellbore can include a well tool. The well tool can include a resizable element configured to longitudinally expand or contract. The well tool can include a first acoustic sensor unit positioned at a first longitudinal end of the resizable element. The well tool can include a second acoustic sensor unit positioned at a second longitudinal end of the resizable element. The system can include a computing device in communication with the first acoustic sensor unit or the second acoustic sensor unit for receiving a wireless communication including a time delay, or a distance between the first acoustic sensor unit and the second acoustic sensor unit, and determining a longitudinal length of the resizable element based on the wireless communication.

Example #9

The system of Example #8 may feature the well tool including a drill stem test tool. The first acoustic sensor unit can be configured to receive a first wireless acoustic signal, wait for a predefined period of time, and/or transmit a second wireless acoustic signal after the predefined period of time has elapsed. The second acoustic sensor unit can be configured to transmit the first wireless acoustic signal at a first time, receive the second wireless acoustic signal at a second time, determine the time delay between the first time and the second time, determine the distance between the first acoustic sensor unit and the second acoustic sensor unit based on the time delay, and/or transmit the wireless communication to the computing device.

Example #10

The system of Example #9 may feature the resizable element including a first slip joint, a second slip joint positioned adjacent to the first slip joint, and a third slip joint positioned adjacent to the second slip joint. The system may feature the first wireless acoustic signal including a pulse. The system may feature the second wireless acoustic signal including another pulse.

Example #11

The system of any of Examples #9-10 may feature the second acoustic sensor unit including a processing device and a memory device in which instructions executable by the processing device are stored. The instructions can be for causing the processing device to transmit the first wireless acoustic signal at the first time; receive the second wireless acoustic signal at the second time; determine the time delay between the first time and the second time by subtracting the first time from the second time; and/or transmit the wireless communication to the computing device.

Example #12

The system of any of Examples #9-11 may feature the second acoustic sensor unit being configured to transmit the first wireless acoustic signal at the first time in response to a command from the computing device or a predetermined time interval elapsing.

Example #13

The system of any of Examples #9-12 may feature the second acoustic sensor unit being configured to transmit the first wireless acoustic signal at the first time in response to a sensor signal from a pressure sensor, a temperature sensor, an accelerometer, a gyroscope, and/or an inclinometer.

Example #14

A method can include transmitting, by a first acoustic sensor unit coupled to a longitudinal end of a resizable element, a first wireless acoustic signal at a first time via an acoustic transmitter. The method can include receiving, by the first acoustic sensor unit, a second wireless acoustic signal at a second time via an acoustic receiver and after transmitting the first wireless acoustic signal. The method can include determining a time delay between the first time and the second time.

Example #15

The method of Example #14 may feature receiving, by a second acoustic sensor unit coupled to another longitudinal end of the resizable element, the first wireless acoustic signal via another acoustic receiver. The method may feature waiting, by the second acoustic sensor unit, for a predefined period of time in response to receiving the first wireless acoustic signal. The method may feature transmitting, by the second acoustic sensor unit, the second wireless acoustic signal via another acoustic transmitter in response to the predefined period of time elapsing.

Example #16

The method of Example #15 may feature determining a speed of sound associated with a medium positioned between the first acoustic sensor unit and the second acoustic sensor unit based on the time delay, a known distance between the first acoustic sensor unit and the second acoustic sensor unit, and/or the predefined period of time.

Example #17

The method of Example #16 may feature determining a distance between the first acoustic sensor unit and the second acoustic sensor unit based on the speed of sound, the time delay, and/or the predefined period of time. The method may feature transmitting a wireless signal to a remote computing device. The wireless signal may include the time delay or the distance between the first acoustic sensor unit and the second acoustic sensor unit.

Example #18

The method of any of Examples #14-17 may feature transmitting the first wireless acoustic signal at the first time in response to a command from a remote computing device or a predetermined time interval elapsing.

Example #19

The method of any of Examples #14-18 may feature transmitting the first wireless acoustic signal at the first time in response to a sensor signal from a pressure sensor, a temperature sensor, an accelerometer, a gyroscope, and/or an inclinometer.

Example #20

The method of any of Examples #14-19 may feature determining a longitudinal length of the resizable element based on the time delay.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A well tool for use in a wellbore, the well tool comprising:
   a resizable element that is longitudinally expandable and contractible;
   a first acoustic sensor unit positioned at a first longitudinal end of the resizable element for receiving a first wireless acoustic signal, waiting for a predefined period of time, and transmitting a second wireless acoustic signal after the predefined period of time has elapsed; and
   a second acoustic sensor unit positioned at a second longitudinal end of the resizable element for transmitting the first wireless acoustic signal at a first time, receiving the second wireless acoustic signal at a second time, determining a time delay between the first time and the second time, and determining a distance between the first acoustic sensor unit and the second acoustic sensor unit based on the time delay.

2. The well tool of claim 1, wherein the resizable element comprises a first telescoping member, a second telescoping member positioned adjacent to the first telescoping member, and a third telescoping member positioned adjacent to the second telescoping member;
   wherein the first wireless acoustic signal comprises a pulse; and
   wherein the second wireless acoustic signal comprises another pulse.

3. The well tool of claim 2, wherein the well tool comprises a drill stem test tool, the first telescoping member comprises a first slip joint, the second telescoping member comprises a second slip joint, and the third telescoping member comprises a third slip joint.

4. The well tool of claim 1, wherein the second acoustic sensor unit comprises a communication device for wirelessly communicating the time delay or the distance between the first acoustic sensor unit and the second acoustic sensor unit to a computing device positionable external to the wellbore.

5. The well tool of claim 4, wherein the second acoustic sensor unit comprises:
   a processing device; and
   a memory device in which instructions executable by the processing device are stored for causing the processing device to:
      transmit the first wireless acoustic signal at the first time;
      receive the second wireless acoustic signal at the second time;
      determine the time delay between the first time and the second time by subtracting the first time from the second time;
      determine the distance between the first acoustic sensor unit and the second acoustic sensor unit based on the time delay; and
      transmit a wireless signal to the computing device comprising the time delay or the distance between the first acoustic sensor unit and the second acoustic sensor unit.

6. The well tool of claim 1, wherein the second acoustic sensor unit is configured to transmit the first wireless acoustic signal at the first time in response to a command from a remote computing device or a predetermined time interval elapsing.

7. The well tool of claim 6, wherein the second acoustic sensor unit is configured to transmit the first wireless acoustic signal at the first time in response to a sensor signal from a pressure sensor, a temperature sensor, an accelerometer, a gyroscope, or an inclinometer.

8. A system for use in a wellbore, the system comprising:
   a well tool comprising:
      a resizable element configured to longitudinally expand or contract;
      a first acoustic sensor unit positioned at a first longitudinal end of the resizable element; and
      a second acoustic sensor unit positioned at a second longitudinal end of the resizable element; and
   a computing device in communication with the first acoustic sensor unit or the second acoustic sensor unit for receiving a wireless communication comprising a time delay or a distance between the first acoustic sensor unit and the second acoustic sensor unit and determining a longitudinal length of the resizable element based on the wireless communication.

9. The system of claim 8, wherein the well tool comprises a drill stem test tool;
   wherein the first acoustic sensor unit is configured to receive a first wireless acoustic signal, wait for a predefined period of time, and transmit a second wireless acoustic signal after the predefined period of time has elapsed; and
   wherein the second acoustic sensor unit is configured to transmit the first wireless acoustic signal at a first time, receive the second wireless acoustic signal at a second time, determine the time delay between the first time and the second time, determine the distance between the first acoustic sensor unit and the second acoustic sensor unit based on the time delay, and transmit the wireless communication to the computing device.

10. The system of claim 9, wherein the resizable element comprises a first slip joint, a second slip joint positioned adjacent to the first slip joint, and a third slip joint positioned adjacent to the second slip joint;
   wherein the first wireless acoustic signal comprises a pulse; and
   wherein the second wireless acoustic signal comprises another pulse.

11. The system of claim 9, wherein the second acoustic sensor unit comprises:
   a processing device; and
   a memory device in which instructions executable by the processing device are stored for causing the processing device to:
      transmit the first wireless acoustic signal at the first time;
      receive the second wireless acoustic signal at the second time;
      determine the time delay between the first time and the second time by subtracting the first time from the second time; and
      transmit the wireless communication to the computing device.

12. The system of claim 9, wherein the second acoustic sensor unit is configured to transmit the first wireless acoustic signal at the first time in response to a command from the computing device or a predetermined time interval elapsing.

13. The system of claim 9, wherein the second acoustic sensor unit is configured to transmit the first wireless acoustic signal at the first time in response to a sensor signal from a pressure sensor, a temperature sensor, an accelerometer, a gyroscope, or an inclinometer.

14. A method comprising:
   transmitting, by a first acoustic sensor unit coupled to a longitudinal end of a resizable element, a first wireless acoustic signal at a first time via an acoustic transmitter;
   receiving, by the first acoustic sensor unit, a second wireless acoustic signal at a second time via an acoustic receiver and after transmitting the first wireless acoustic signal; and
   determining a time delay between the first time and the second time.

15. The method of claim 14, further comprising:
   receiving, by a second acoustic sensor unit coupled to another longitudinal end of the resizable element, the first wireless acoustic signal via another acoustic receiver;
   waiting, by the second acoustic sensor unit, for a predefined period of time in response to receiving the first wireless acoustic signal; and
   transmitting, by the second acoustic sensor unit, the second wireless acoustic signal via another acoustic transmitter in response to the predefined period of time elapsing.

16. The method of claim 15, further comprising:
   determining a speed of sound associated with a medium positioned between the first acoustic sensor unit and the second acoustic sensor unit based on the time delay, a known distance between the first acoustic sensor unit and the second acoustic sensor unit, and the predefined period of time.

17. The method of claim 16, further comprising:
   determining a distance between the first acoustic sensor unit and the second acoustic sensor unit based on the speed of sound, the time delay, and the predefined period of time; and
   transmitting a wireless signal to a remote computing device comprising the time delay or the distance between the first acoustic sensor unit and the second acoustic sensor unit.

18. The method of claim 14, further comprising:
   transmitting the first wireless acoustic signal at the first time in response to a command from a remote computing device or a predetermined time interval elapsing.

19. The method of claim 14, further comprising:
   transmitting the first wireless acoustic signal at the first time in response to a sensor signal from a pressure sensor, a temperature sensor, an accelerometer, a gyroscope, or an inclinometer.

20. The method of claim 14, further comprising:
   determining a longitudinal length of the resizable element based on the time delay.

* * * * *